United States Patent [19]

Yamada et al.

[11] Patent Number: 5,280,312
[45] Date of Patent: Jan. 18, 1994

[54] VISUAL AXIS DETECTION APPARATUS

[75] Inventors: Akira Yamada, Yokohama; Akihiko Nagano, Kawasaki; Kazuki Konishi, Tokyo, all of Japan

[73] Assignee: Canon Kabushiki Kaisha, Tokyo, Japan

[21] Appl. No.: 823,773

[22] Filed: Jan. 22, 1992

[30] Foreign Application Priority Data

Jan. 22, 1991 [JP] Japan .................................. 3-022833

[51] Int. Cl.⁵ .............................................. A61B 3/10
[52] U.S. Cl. ...................................... 351/211; 351/200; 351/205
[58] Field of Search ................ 351/200, 205, 211, 246, 351/210

[56] References Cited

FOREIGN PATENT DOCUMENTS 61-172552 8/1986 Japan .

Primary Examiner—Bruce Y. Arnold
Assistant Examiner—Hung Xuan Dang
Attorney, Agent, or Firm—Fitzpatrick, Cella, Harper & Scinto

[57] ABSTRACT

A visual axis detection apparatus in which an eye of an observer is illuminated by a light source, and the corneal reflection image of the eye and the reflected image of the iris are detected by a light sensor. By the utilization of the position information of each reflected image from the sensor, the visual axis of the eye is calculated by a calculator. The light sensor has a plurality of photoelectric elements, and the calculator utilizes the position information of one of a plurality of photoelectric elements which produces the smallest output signal to detect the reflected image of iris on the basis of the signal from the light sensor.

7 Claims, 10 Drawing Sheets

FIG. IIA
PRIOR ART
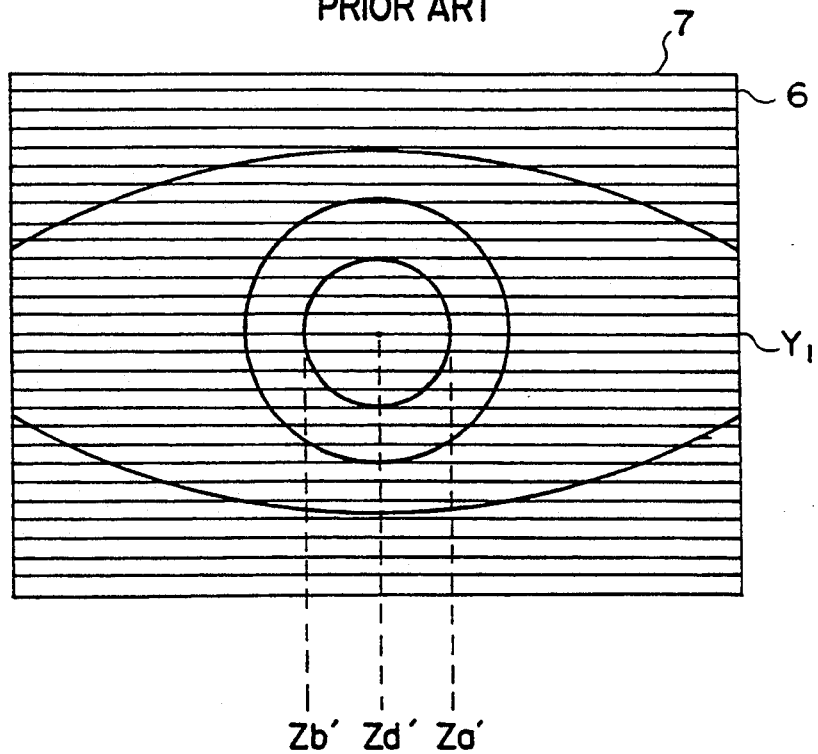
FIG. IIB
PRIOR ART
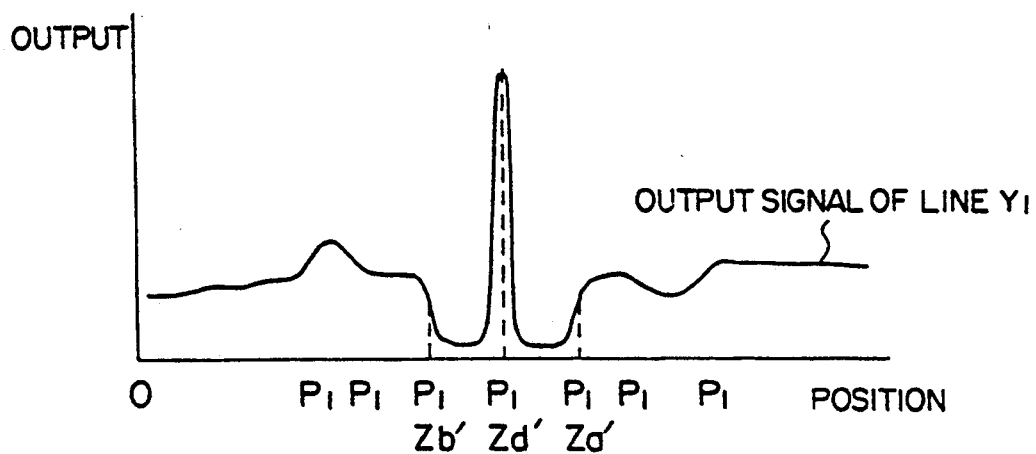

VISUAL AXIS DETECTION APPARATUS

BACKGROUND OF THE INVENTION

1. Field of the Invention

This invention relates to a visual axis detection apparatus, and particularly to a visual axis detection apparatus in an optical apparatus such as a camera designated to detect the axis in the direction of a viewing point being observed by an observer (photographer) on an observation surface (a focusing screen) on which is formed an object image by a photo-taking system, i.e., the so-called visual axis, by the utilization of a corneal reflection image obtained when the surface of an eyeball of the observer is illuminated.

2 Related Background Art

There have heretofore been proposed various apparatuses for detecting which position on an observation surface the observer is observing, i.e., detecting the so-called visual axis.

For example, in Japanese Laid-Open Patent Application No. 61-172552, a parallel light beam from a light source is projected onto the front eye part of an eyeball of the observer and the visual axis is formed by the utilization of the image positions of the corneal reflection image by the reflected light from the cornea and a pupil. FIGS. 10A and 10B of the accompanying drawings illustrate the principle of a visual axis detecting method, FIG. 10A being a schematic view of a visual axis detecting optical system, and FIG. 10B showing the intensity of an output signal from a photoelectric element array 6.

In FIG. 10A, the reference numeral 5 designates a light source such as a light emitting diode which emits infrared light not sensed by the observer. The light source 5 is disposed on the focal plane of a light projecting lens 3.

The infrared light emitted from the light source 5 is collimated by the light projecting lens 3, is reflected by a half mirror 2 and illuminates the cornea 21 of an eyeball 201. At this time, the corneal reflection image (Purkinje image) d by part of the infrared light reflected by the surface of the cornea is transmitted through the half mirror 2, is condensed by a light receiving lens 4 and is re-imaged at a position $Zd'$ on the photoelectric element array 6.

Also, a light beam from the end portions a and b of an iris 23 form the images of these end portions a and b at positions $Za'$ and $Zb'$ on the photoelectric element array 6 through the half mirror 2 and the light receiving lens 4. Where the rotation angle $\theta$ of the optical axis OA2 of the eyeball with respect to the optical axis of the light receiving lens 4 (the optical axis OA1) is small, when the Z coordinates of the end portions a and b of the iris 23 are Za, Zb, the coordinates Zc of the center position c of the iris 23 are expressed as $$Zc \approx (Za+Zb)/2.$$

Also, when the Z coordinates of the position d at which the corneal reflection image is created and the distance between the center of curvature 0 of the cornea 21 and the center C of the pupil 24 is $L_{OC}$, the rotation angle $\theta$ of the optical axis OA2 of the eyeball substantially satisfies the following relational expression:

$$L_{OC} * \text{SIN}\theta \approx Zc - Zd. \tag{1}$$

Here, the Z coordinates Zd of the position d of the corneal reflection image and the Z coordinates Zo of the center of curvature 0 of the cornea 21 are coincident with each other. Therefore, in calculation means 9, the positions of particular points (the reflected image d of the cornea and the end portions a and b of the iris) projected onto the surface of the photoelectric element array 6 as shown in FIG. 10B are detected, whereby the angle of rotation $\theta$ of the optical axis OA2 of the eyeball can be found. At this time, expression (1) is rewritten into as $$\beta * L_{OC} * \text{SIN}\theta \approx \frac{Za' + Zb'}{2} - Zd', \tag{2}$$

where $\beta$ is a magnification determined by the distance L1 between the position d at which the corneal reflection image is created and the light receiving lens 4 and the distance L0 between the light receiving lens 4 and the photoelectric element array 6, and usually is a substantially constant value.

This is effective, for example, for saving the trouble of selecting sand inputting one of distance measuring points provided not only at the center of the image field but also at a plurality of locations in the image field in the automatic focus detecting apparatus of a camera when the observer attempts to select one of those distance measuring points and perform automatic focus detection, and regarding that point being observed by the observer as a distance measuring point, and automatically selecting the distance measuring point to thereby accomplish automatic focus detection.

In a visual axis detection apparatus according to the prior art, an image sensor 7 (image pickup means), comprising a plurality of photoelectric element arrays 6, such as CCDs, is used as light receiving means.

FIG. 11A of the accompanying drawings is an illustration showing the corneal reflection image of an eyeball and the reflected image of the iris formed on the surface of such an image sensor 7, and FIG. 11B of the accompanying drawings is an illustration of an output signal from one of the photoelectric element arrays 6 of FIG. 11A.

In these figures, the positions of the corneal reflection image $Zd'$ and the marginal points $Za'$ and $Zb'$ of the iris 23 and the pupil 24 are detected by a photoelectric element array Y1.

Generally, a method whereby an output signal from a photoelectric element array is A/D-converted, whereafter it is subjected to a differential process is known as a positive detecting method using an image sensor.

As shown in FIG. 11B, the output signal from the photoelectric element array for the corneal reflection image $Zd'$ is very great and can be detected relatively easily. On the other hand, the output signals from the photoelectric element arrays for the marginal points $Za'$ and $Zb'$ of the iris 23 and the pupil 24 are weak, and the reflectivity of the iris 23 differs from person to person. Therefore, a ghost or a flare can enter a detecting optical system, and in the case of a person wearing glasses, reflected images from the glasses provide a noise component, and this reduces the detection accuracy of the marginal points $Za'$ and $Zb'$.

For example, when an attempt is made to take the differential value of the output signals of FIG. 11B and detect it by a predetermined threshold value, a plurality of points which can be regarded as the marginal point P1 of the iris 23 and the pupil 24 will come into existence.

This has led to a case where the reliability of the detection position becomes low and the visual axis is detected erroneously. To avoid this, it is necessary to use new software, and this has resulted in the problem that the calculation process becomes complex and further, the calculation speed becomes low and it becomes difficult to effect visual axis detection in real time.

SUMMARY OF THE INVENTION

The present invention has as its object the provision of a visual axis detection apparatus which utilizes an output signal from one of a plurality of photoelectric element arrays forming the image sensor of light receiving means which satisfies a present condition to detect the positional information of the reflected image of an iris highly accurately and which is high in detection speed and capable of accomplishing highly accurate visual axis detection.

According to an embodiment of the present invention, reflected light from an eye is received by a plurality of photoelectric conversion element arrays, the position of one of these photoelectric conversion elements which effects the smallest signal output is detected and memorized, and further, on the basis of this position, the position of that photoelectric conversion element which outputs a signal indicative of a particular point of the eye, for example, the boundary between the iris and pupil of the eye, is detected and memorized. On the other hand, the position of that photoelectric conversion element which outputs a signal regarding a Purkinje image (a highest level signal) is detected, and the visual axis is calculated on the basis of this position signal and the signal indicative of the position of the aforementioned particular point is calculated. Particularly, this specification discloses a visual axis detection apparatus which is made high in reliability by checking up the output signals of not all photoelectric conversion elements, but of photoelectric conversion elements within a predetermined range when a photoelectric conversion element indicative of the aforementioned boundary is to be detected.

BRIEF DESCRIPTION OF THE DRAWINGS

FIGS. 11A and 11B are illustrations of the reflected image from an eyeball on the surface of the image sensor of FIG. 10.

DETAILED DESCRIPTION OF THE PREFERRED EMBODIMENTS

Figure 1A:
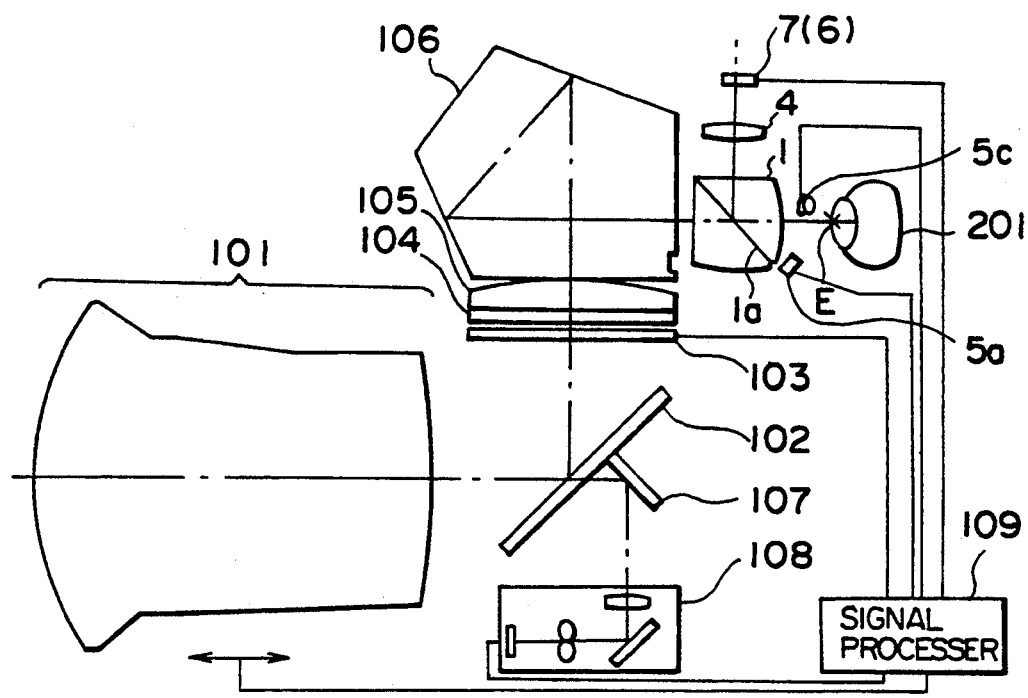
FIG. 1A is a schematic view of the essential portions of a first embodiment when the present invention is applied to a single-lens reflex camera.
Figure 1B:
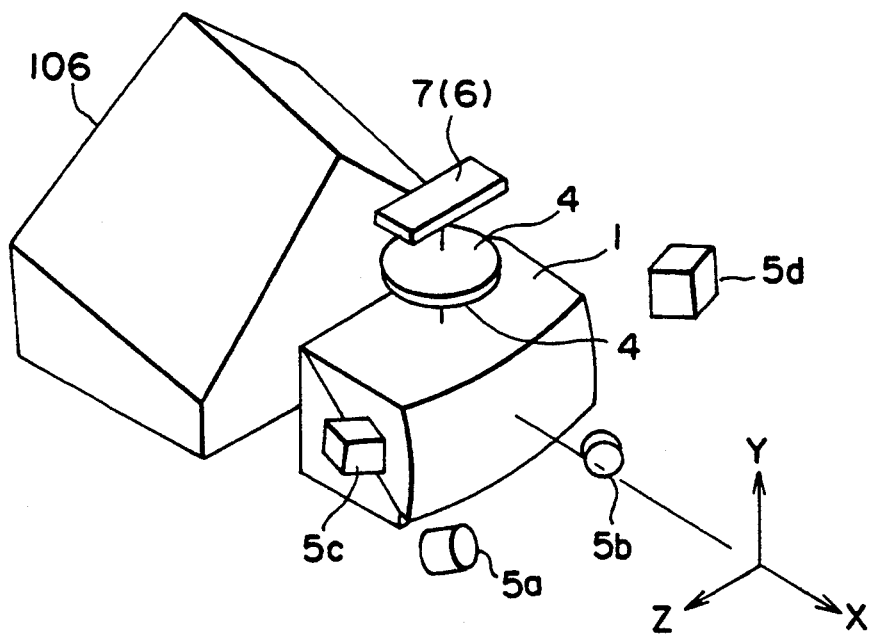
FIG. 1B is an illustration of portions of FIG. 1A.
Figure 2:
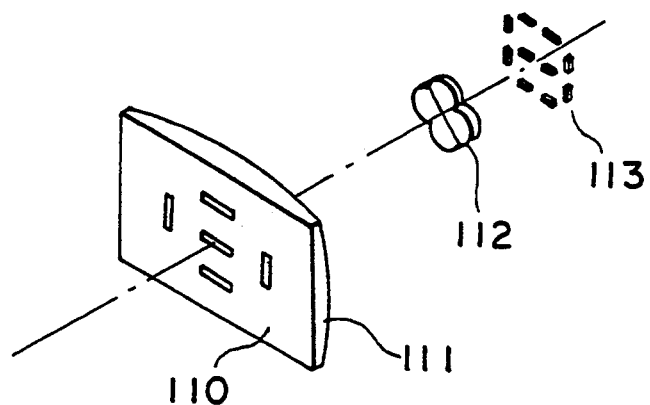
FIG. 2 is a perspective view of the essential portions of the focus detection system of FIG. 1.

FIG. 1A is a schematic view of the essential portions of the optical system of an embodiment when the present invention is applied to a single-lens reflex camera, and FIG. 1B is an illustration of portions of FIG. 1A. FIG. 2 is a perspective view of the essential portions of the focus detection system of FIG. 1A.

In these figures, the reference numeral 1 designates an eyepiece in which a dichroic mirror 1a transmitting visible light therethrough and reflecting infrared light is obliquely disposed and which serves also as an optical path divider.

The reference numeral 4 denotes a light receiving lens, and the reference characters 5a, 5b, 5c and 5d designate illuminating means, each of which comprises, for example, a light emitting diodes 5a and 5b are cornea illuminating portions, which are disposed below the eyepiece 1 and chiefly create a corneal reflection image. As the light emitting diodes 5a and 5b, use is made of ones of having a spot property which are small in apparent chip size in order to detect the corneal reflection image with the best possible resolving power.

The light emitting diodes 5c and 5d are iris illuminating portions, which are disposed on the opposite sides of the eyepiece 1 and are for the detection of iris information. As the light emitting diodes 5c and 5d, use is made of ones having a diffusing property or a surface light emitting characteristic.

The light emitting diodes 5c and 5d have such an illumination range that the illumination of an eyeball becomes possible even when the eyeball deviates from the center of the optical axis, and are disposed so that the corneal reflection image may always be formed on the surface of an image sensor by the light receiving lens 4. The image sensor 7 comprises a plurality of photoelectric conversion element arrays 6. The light receiving lens 4 and the image sensor 7 each constitute one element of light receiving means.

The reference numeral 101 designates a photo-taking lens, the reference numeral 102 denotes a quick return (QR) mirror, the reference numeral 103 designates an indicating element, the reference numeral 104 denotes a focusing screen, the reference numeral 105 designates a condenser lens, the reference numeral 106 denotes a pentaprism, the reference numeral 107 designates a sub-mirror, and the reference numeral 108 denotes a multipoint focus detecting device which selects a plurality of areas in the photographing image field and effects focus detection.

A description of the multipoint focus detecting device is not necessary for the understanding of the present invention and therefore, it is only briefly described herein. That is, in the present embodiment, as shown in FIG. 2, a field mask 110 disposed near the predetermined imaging plane of the photo-taking lens 101 and having a plurality of slits for determining distance measuring areas, respectively, and a lens member 111 serving as a field lens for the image in each slits are disposed in proximity to each other, and further, a set 112 of re-imaging lenses and a set 113 of photoelectric element arrays corresponding in number to the slits are disposed in succession. The field mask 110, the field lens 111, the set 112 of re-imaging lenses and the set 113 of photoelectric element arrays together constitute a well-known focus detection system.

In the present embodiment, part of the object light transmitted through the photo-taking lens 101 is reflected by the OR mirror 102 and forms an object image near the focusing screen 104. The object light diffused by the diffusing surface of the focusing screen 104 is directed to an eye point E through the condenser lens 105, the pentaprism 106 and the eyepiece 1.

The indicating element 103 is, for example, a two-layer type guest-host liquid crystal element which does not use a polarizing plate, and indicates the distance measuring area (the focus detection position) in a finder field.

Also, part of the object light transmitted through the photo-taking lens 101 is transmitted through the QR mirror 102, is reflected by the submirror 107 and is directed to the aforementioned multipoint focus detecting device 108 disposed at the bottom of a camera body. Further, on the basis of the focus detection information of the position on the surface of the object selected by the multipoint focus detecting device 108, the outward axial movement (or the inward axial movement) of the photo-taking lens 101 is effected by a photo-taking lens driving device, not shown, to thereby effect focus adjustment.

The visual axis detection apparatus according to the present embodiment is comprised of a visual axis detection system comprising members designated by the reference numerals 1, 4, 5, 7 (6), and a signal processing circuit 109 which is calculation means.

Figure 3:
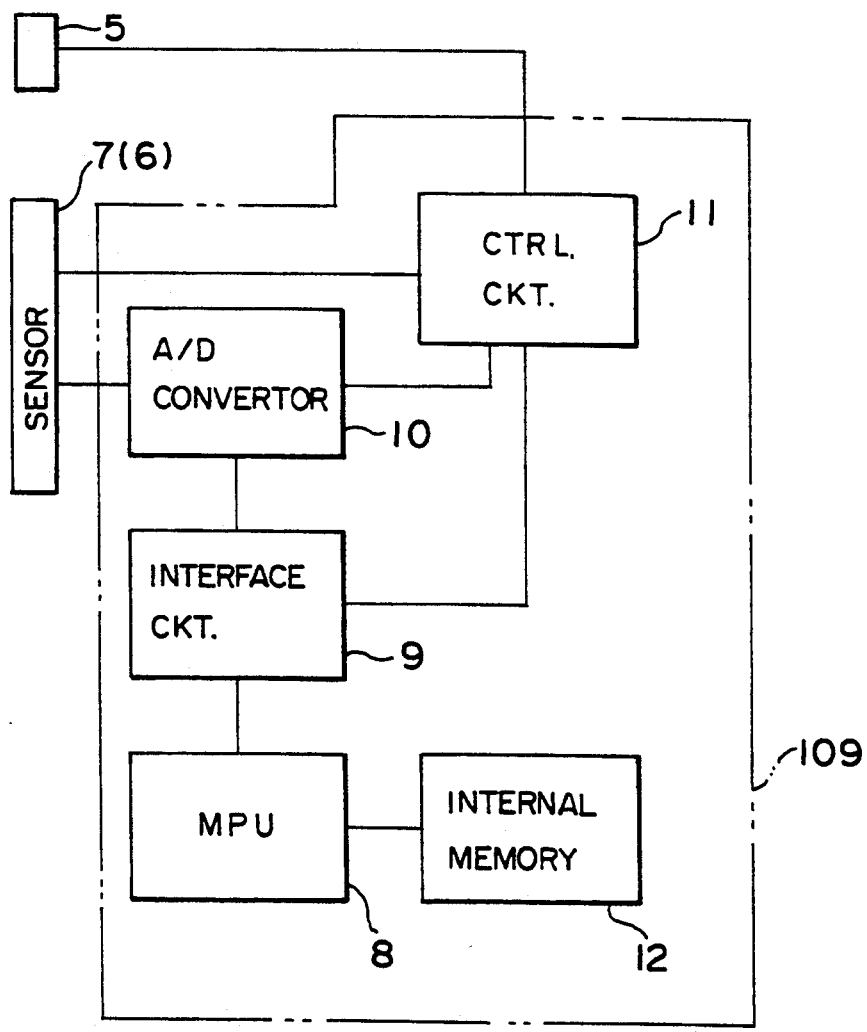
FIG. 3 is a block diagram of the essential portions of the signal processing circuit of FIG. 1A.

FIG. 3 is a block diagram of the essential portions of the signal processing circuit 109 of FIG. 1A. In this figure, the reference numeral 8 designates a microprocessing unit (MPU), and the reference numeral 9 denotes an interface circuit which couples the MPU 8 and various circuits together. The reference numeral 10 designates an A/D converter, and the reference numeral 11 denotes a control circuit which controls the timing of the light projection of the illuminating means 5 and the light reception of the image sensor 7. The reference numeral 12 designates an external memory.

The control signal from the MPU 8 is given to the control circuit 11 through the interface circuit 9. Timing pulses of the integration time, read-out tie, etc. of the image sensor 7 are made in the control circuit 11, and the image sensor 7 is controlled by these timing pulses. If required, the light emission from the illuminating means 5 is likewise controlled.

The image signal from the image sensor 7 is A/D-converted by the A/D converter 10 in synchronism with the timing pulses made in the control circuit 11, and is read by the MPU 8 through the interface circuit 9. That data is memorized in the external memory 12 as required.

The MPU 8 has a circuit for detecting the optical axis of the eyeball, an eyeball discriminating circuit for discriminating between the right eye and the left eye, a visual axis correcting circuit for correcting any irregularity by the size of the eyeball, a watching point detecting circuit, etc., and performs various calculation processes by the use of the aforementioned data.

In the visual axis detection system, the infrared light emitted from the infrared light emitting diodes 5 enters the eyepiece 1 from above, is reflected by the dichroic mirror 1a and illuminates the eyeball 201 of the observer situated near the eye point E. Also, the infrared light reflected by the eyeball 201 is reflected by the dichroic mirror 1a and forms an image on the photoelectric element array 6 while being converged by the light receiving lens 4. Also, the signal processing circuit 109 executes its process by the software of the MPU 8.

Watching point information detected in the watching point detecting circuit is first transmitted to the indicating element 103 and the multipoint focus detecting device 108. The indicating element 103 indicates the location watched by the observer in the finder of the camera, and performs the role of confirming the watching point (focus detection point).

Also, in the multipoint focus detecting device 108, the focus detection of the point watched by the observer and focus adjustment is effected for a watched object.

Figure 4A:
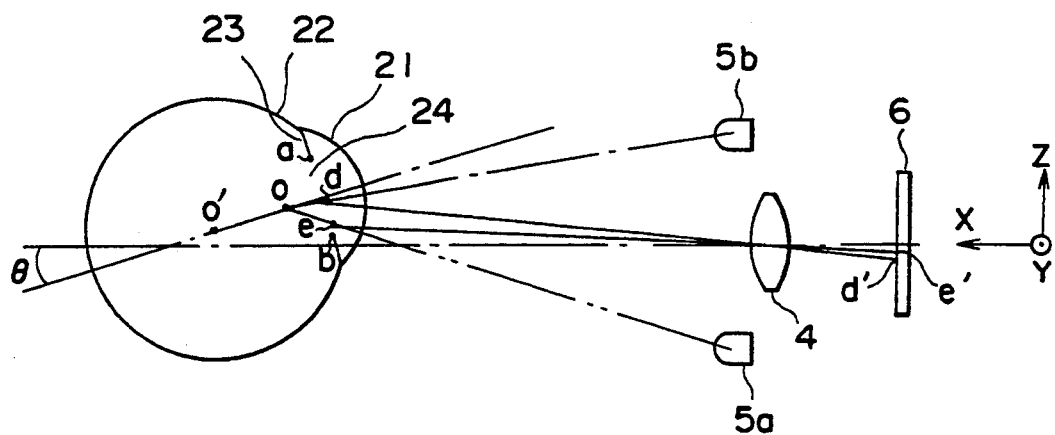
FIGS. 4A and 4B illustrate the optical principle of the visual axis detection system of the present invention.
Figure 4B:
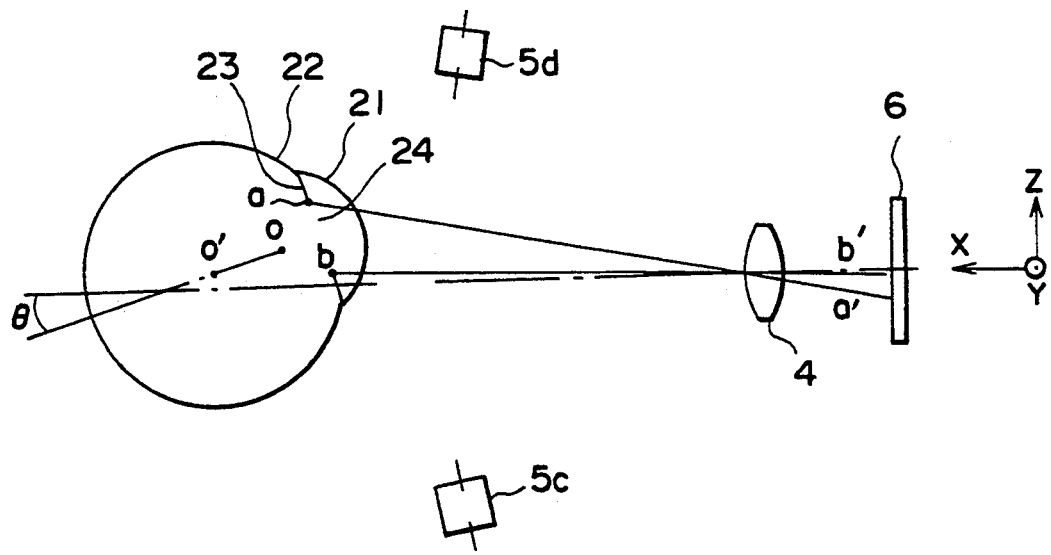

FIGS. 4A and 4B illustrate the optical principle of the visual axis detection system according to the present invention. As shown in FIG. 4A, the infrared light emitting diodes $5a$ and $5b$ for generating the corneal reflection image are disposed at locations shifted in the array direction of the photoelectric element array 6 (Z direction) and the direction orthogonal to the array direction (Y direction) relative to the optical axis of the light receiving lens 4 (the X-axis).

In FIG. 4A, the light beams from the infrared light emitting diodes $5a$ and $5b$ disposed separately in the array direction of the photoelectric element array 6 (the Z-axis direction) form corneal reflection images e and d, respectively, at locations separate in the Z-axis direction.

At this time, the Z coordinates of the midpoint of the corneal reflection images e and d coincide with the Z coordinates of the center of curvature 0 of the cornea 21. Also, the spacing between the corneal reflection images e and d varies correspondingly to the distance between the infrared light emitting diode and the eyeball of the observer and therefore, by detecting the positions of the corneal reflection images re-imaged on the photoelectric element array 6, i.e., the positions e' and d' at which the output signal level is highest, it becomes possible to find the imaging magnification $\beta$ of the reflected image from the eyeball.

As shown in FIG. 4B, the infrared light emitting diodes $5c$ and $5d$ for detecting iris information illuminate the eyeball from the sideways direction (Z direction) with respect to the optical axis of the light receiving lens 4.

Each element is disposed so that at this time, the corneal reflection images by the infrared light emitting diodes $5c$ and $5d$ may not be re-imaged on the surface of the photoelectric element, array 6 by the light receiving lens 4. As a result, ghosts or flares which are unnecessary light are prevented from entering the vicinity of the marginal positions a and b of the iris and the pupil on the surface of the photoelectric element array 6, whereby any reduction in the detection accuracy of the marginal positions a and b is prevented.

Figure 5A:
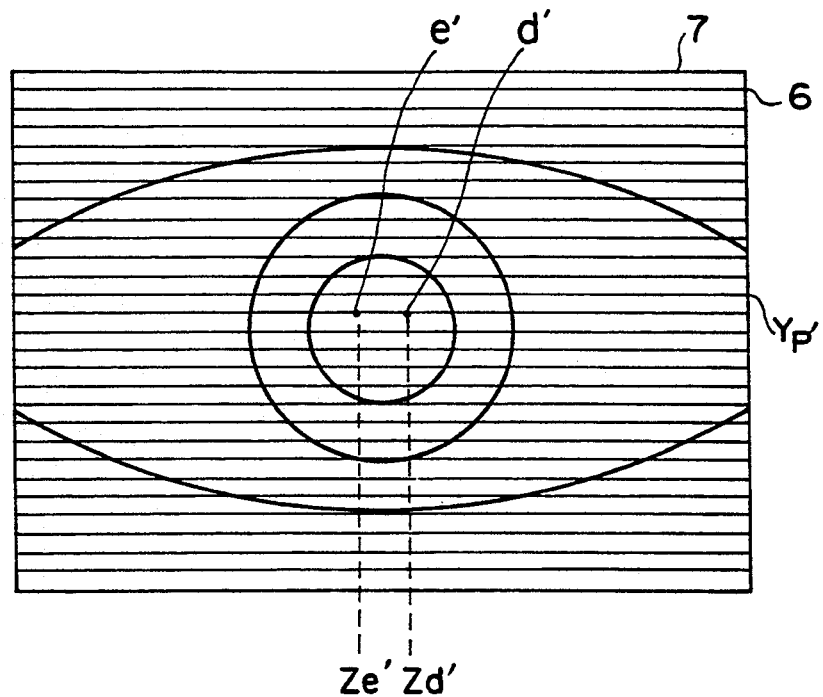
FIGS. 5A and 5B illustrate the reflected image from an eyeball on the surface of a photoelectric element array according to the present invention and an output signal from the photoelectric element array.
Figure 6A:
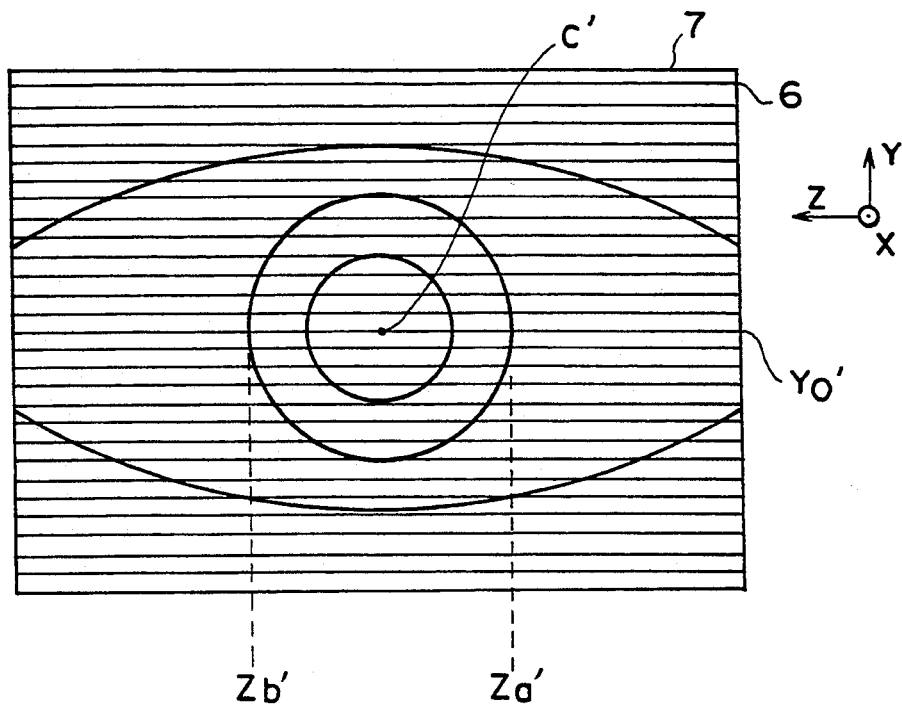
FIGS. 6A and 6B illustrate the reflected image from the eyeball on the surface of the photoelectric element array and the output signal from the photoelectric element array.

FIGS. 5A and 6A each are an illustration showing the reflected image from the eyeball formed on the surface of the image sensor 7 in the present embodiment.

Figure 5B:
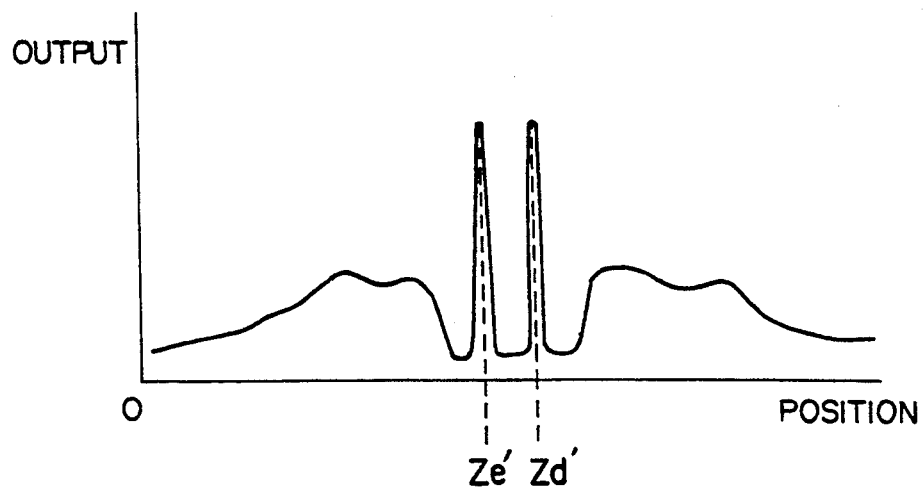

FIG. 5A shows corneal reflection images e' and d' by the infrared light emitting diodes $5a$ and $5b$, respectively, and these images are formed on the surface of a photoelectric element array $Y_P$. The output signal from the photoelectric element array $Y_P$ at this time is shown in FIG. 5B.

Figure 6B:
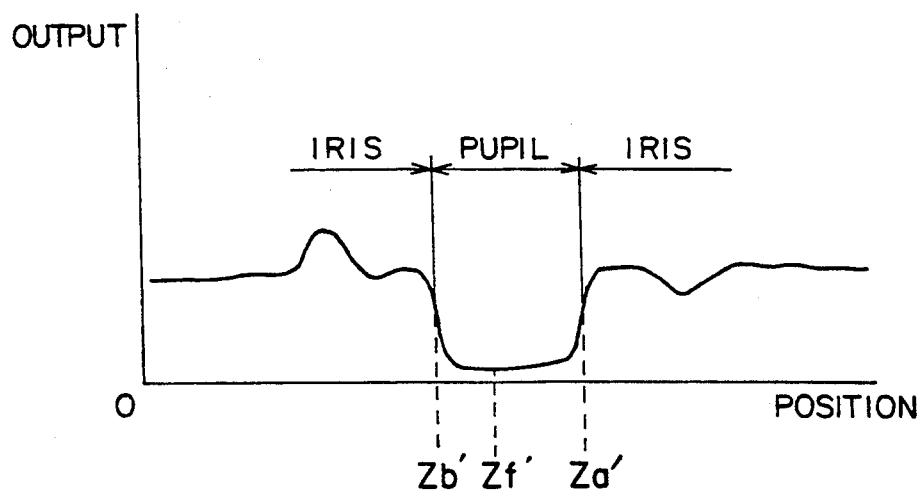

FIG. 6A is an illustration showing a reflected image based on iris information by the infrared light emitting diodes 5c and 5d. In this figure, no corneal reflection image is created. As shown in FIG. 5A, usually the photoelectric element array $Y_P$ formed by the corneal reflection image is created in +Y direction from a photoelectric element array $Y_O$ in which the center c' of the pupil exists. Therefore, the signal from the photoelectric element array $Y_O$ shifted by a predetermined amount from the photoelectric element array $Y_P$ is read out in order to detect the marginal points of the iris and pupil as accurately as possible. The output signal from the photoelectric element array $Y_O$ at this time is shown in FIG. 6B.

Figure 7:
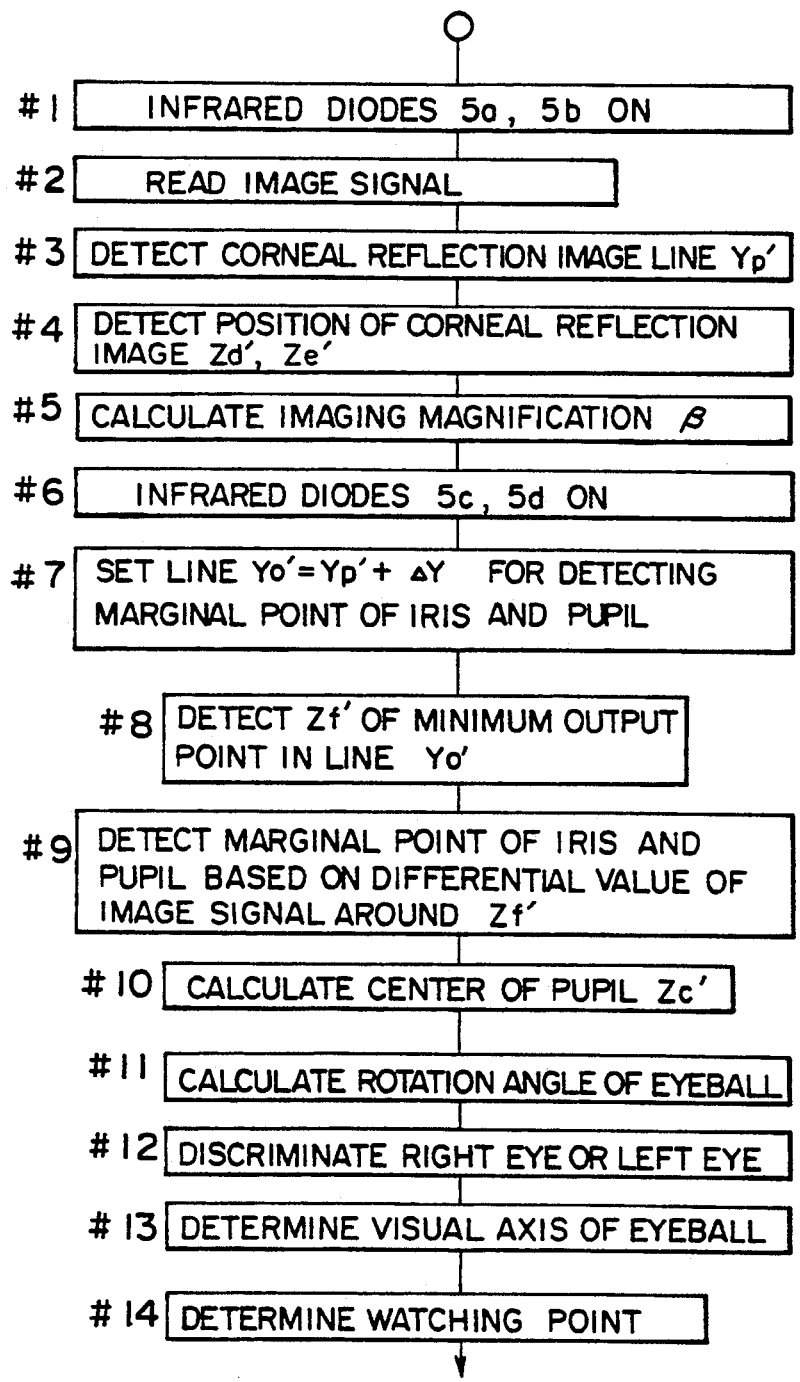
FIG. 7 is a flow chart of a first embodiment of the present invention.

A visual axis detecting method in the present embodiment will now be described with reference to the flow chart of FIG. 7.

The rotation angle of the optical axis of the eyeball is first detected in an eyeball optical axis detection circuit included in the MPU 8 in the signal processing circuit 109. For that purpose, the infrared light emitting diodes 5a and 5b for detecting the corneal reflection image are first turned on (#1). The image signal of the reflected image formed thereby on the surface of the image sensor 7 is A/D-converted. and is read by the MPU 8 (#2). The photoelectric element array (line) $Y_P$ which outputs a signal indicative of the corneal reflection image, i.e., the highest level signal, is detected from the image signal read from those of the photoelectric conversion element arrays in +Y direction (#3). At the same time, the positions Zd' and Ze' in the direction of array at which the corneal reflection images e' and d' are created are detected (#), and the imaging magnification $\beta$ of the optical system is found from the spacing |Zd'·Ze'| between these corneal reflection images (#5).

Subsequently, the infrared light emitting diodes 5c and 5d for detecting the iris information are turned on (#6). The line (photoelectric element array) $Y_O$ for detecting the marginal points of the iris and pupil which are spaced apart by a predetermined distance $\Delta Y$ from the photoelectric element array $Y_P$ is set (#7).

Subsequently, the position at which the smallest output of the image signals of the line $Y_O$ is being produced is detected (#8). On the basis of the position information at this time, the marginal points Za' and Zb' of the iris and the pupil are detected from the differential value of the image signal around it (#9). By the use of these two points, the center of the pupil is calculated as Zc'=(Za'+Zb')/2 (#10).

By the use of the positions Zd' and Ze' of the corneal reflection images e' and d', the aforementioned expression (2) is modified, and the rotation angle $\theta$ of the optical axis of the eyeball. is found as $$\beta * L_{OC} * \sin\theta = Zc' - \frac{Zd' + Ze'}{2} \quad (\#11) \qquad (3)$$

Further, in the eyeball discrimination circuit included in the signal processing circuit 109, whether the eye of the observer looking into the finder optical system is the right eye or the left eye is discriminated, for example, from the distribution of the calculated rotation angle of the optical axis of the eyeball (#12), and further in the visual axis correction circuit, correction of the visual axis is effected on the basis of the eyeball discrimination information and the rotation angle of the optical axis of the eyeball (#13) and also, in the watching point detection circuit, the watching point is calculated on the basis of the optical constant of the finder optical system (#14).

A method of detecting the marginal points of the iris and pupil from the information of the reflected image of the iris at the steps #8 and #9 of the flow chart of FIG. 7 will hereinafter be described in detail. The output signals of the reflected image of the eyeball when these marginal points are detected are such as shown in FIG. 6B. Generally, to detect these marginal points, a differential signal is taken from these output signals and the marginal points are detected from a value equal to or greater than a predetermined threshold value. However, the pupil portion absorbs almost all of the illuminating light beam and therefore, the output signal is at a level approximate to that of a dark signal.

So, in the present embodiment, by the utilization of this fact, the photoelectric element array (picture element) which produces the smallest output of the output signals is detected and the marginal points nearest thereto are judged as the marginal points of the iris and pupil.

In order that the portion which produces the smallest output at this time may surely be the pupil portion, it is necessary to uniformly illuminate the range of the eye corresponding to the area of the image sensor 7. Therefore, in the present embodiment, the infrared light emitting diodes 5c and 5d for detecting iris information which illuminate the entire eyeball are provided exclusively for this purpose.

Figure 8:
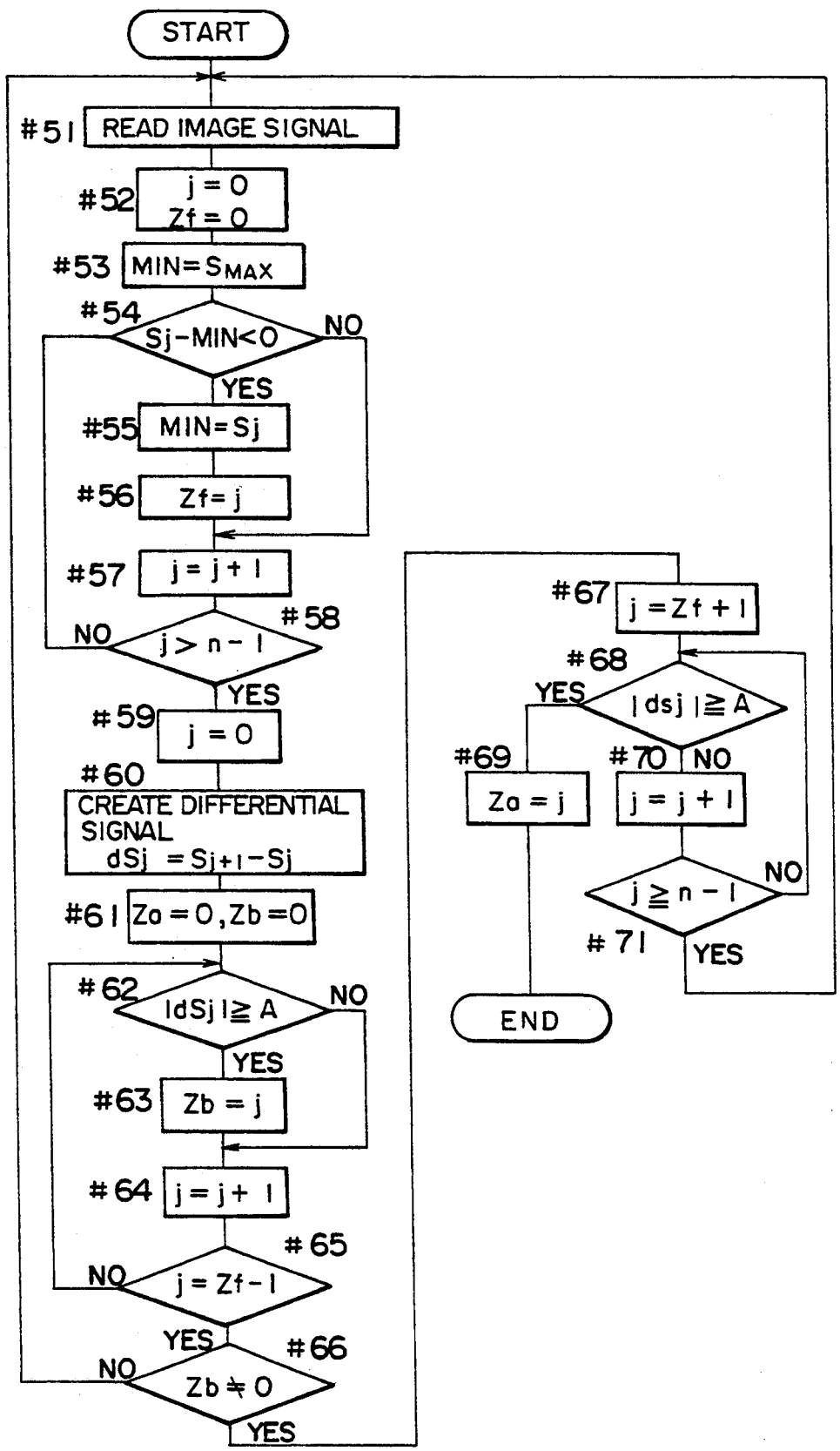
FIG. 8 is a flow chart of the first embodiment of the present invention.

FIG. 8 is a flow chart for detecting the marginal points of the iris and pupil.

The reading of the image signal Sj of the line $Y_O$ stored in the external memory 12 connected to the signal processing circuit 109 is first effected. This signal Sj is the jth picture element output signal and corresponds to each picture element $0 \leq j \leq n$ of the image sensor 7(#51). j is a picture element number which assumes a positive integer, and is reset to j=0, and the position Zf of the photoelectric element array the output of whose image signal is smallest is reset to 0 (#52). Steps #53-#58 are a detection flow for finding the minimum value of a generally used known parameter. In this flow, $S_{MAX}$ is the maximum value the image signal can assume, and at first, this maximum value is memorized in MIN (#53). For example, in the present embodiment, use is made of an 8-bit A/D converter, and at this time, this initial maximum value is 256. Subsequently, the signal output value Sj of the photoelectric conversion element in which the value obtained by subtracting the aforementioned $S_{MAX}$ from the jth signal output Sj is negative, that is, which effects the smallest electrical output among the successively compared outputs, and the position j thereof are memorized (#56 -#57). This work is continued until it is executed for all photoelectric conversion elements in one line (#58). In this manner, the picture element (position) Zf of the photoelectric element array the output of whose image signal is smallest is determined. Subsequently, j is reset to j=0 (#59). A differential signal dSj is found from the following equation (4) (#60):

$$dSj' = dSj + 1 - dSj, \qquad (4)$$

where j' is a positive integer which is $0 < j < n-1$.

The picture elements (positions) Za and Zb of the photoelectric element arrays indicative of the marginal points of the iris and pupil are reset to 0 (#61). If the differential value dSj is greater than a threshold value level A for discrimination (#62), the then j is put as the left-hand marginal point Zb in FIG. 6A (#63). This is repeated up to Zf-1 in which the minimum output picture element (position) exists (#64–#65). As a result, Zb is renewed each time the differential value dSj is greater than the threshold value A, and the point which is nearest to Zf and at which the differential value is greater than the threshold value A is memorized as the marginal point Zb. It is confirmed that Zb is not the initial value (#66).

Subsequently, the parameter is advanced farther than j =Zf (#67) and whether the differential value dSj is greater than the threshold value A is judged again (#68), and if it is greater, detection is terminated with this as Za which is the right-hand marginal point in FIG. 6A. That is, the marginal point which has exceeded for the first time the threshold value from the position of Zf is detected as Za. If the differential value dSj is smaller than the threshold value A, this judgment until j=n−1 is repeated (#69−#70). If the marginal point cannot be detected to the last, the image signal is re-read from the first with detection being regarded as impossible.

Figure 9:
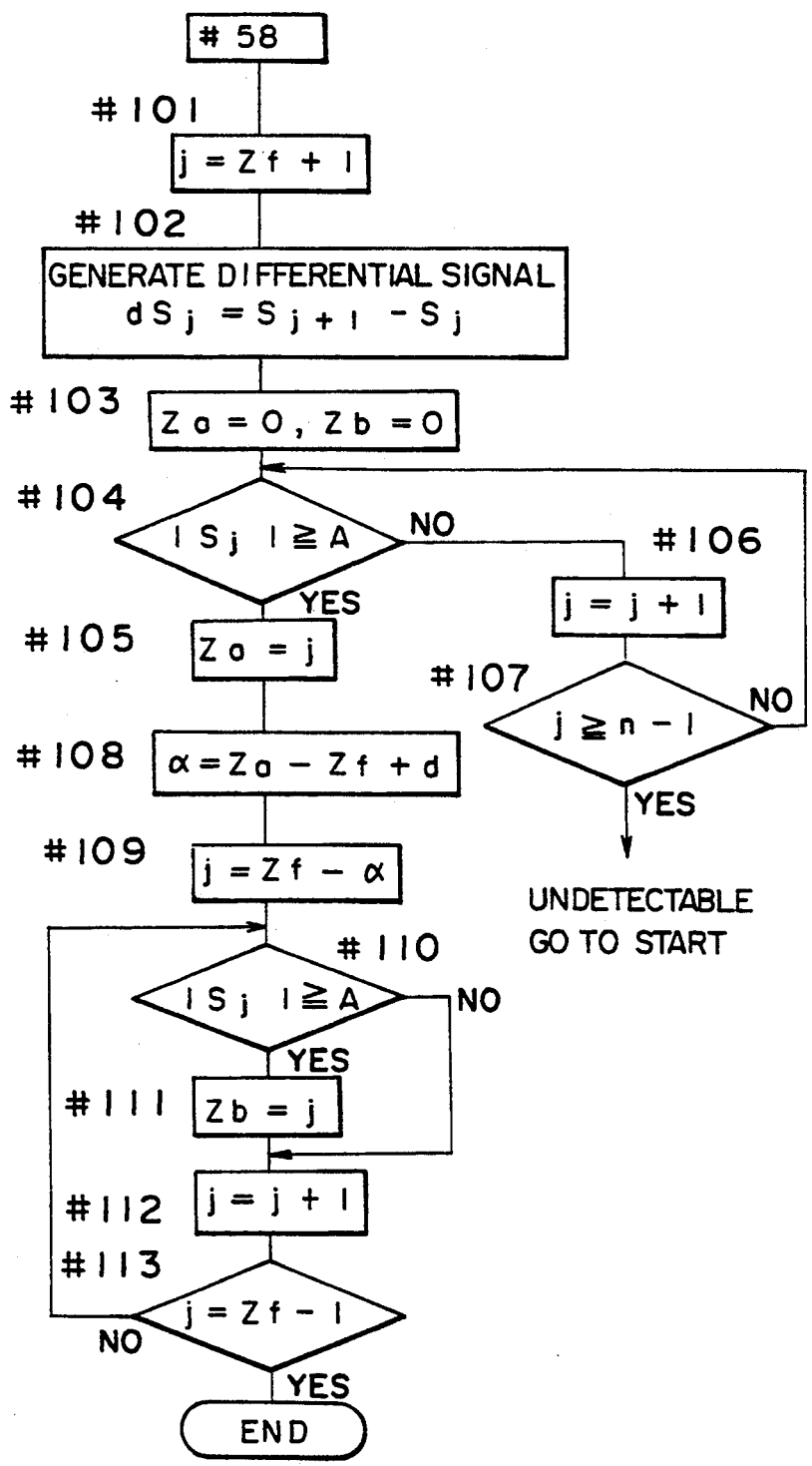
FIG. 9 is a flow chart of a second embodiment of the present invention.
Figure 10A:
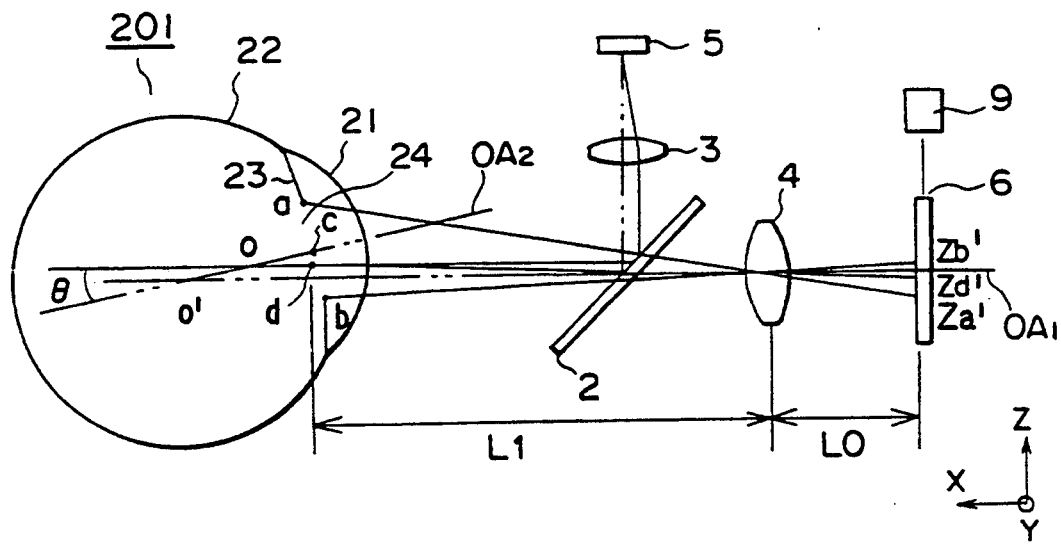
FIG. 10A is a schematic view of the essential portions of a visual axis detection apparatus according to the prior art.
Figure 10B:
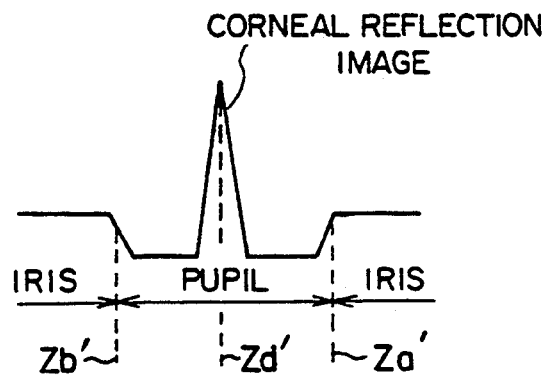
FIG. 10B is an illustration of portions of FIG. 10A.

FIG. 9 is a flow chart of a second embodiment of the present invention. In the present embodiment, steps up to a step #58 are the same as the steps in the first embodiment of FIG. 8.

That is, the picture element (position) Zf from the photoelectric element array the output of whose image signal is smallest is detected, and a marginal point Za' which is on the right side of Zf shown in FIG. 6B is detected and j is set to j=Zf+1 (#101).

Subsequently, a differential signal dSj is found from the aforementioned equation (4) (#102). The picture elements (positions) Za and Zb of the photoelectric element arrays which are indicative of the marginal points of the iris and pupil are reset to 0 (#103). If the differential value dSj is greater than the threshold value A for discrimination (#104), the then j is memorized as the marginal point Za (#105). If the differential value dSj is smaller than the threshold value A, this judgment is repeated until j=n−1 (#106−#107). If none can be detected to the last, the image signal is re-read from the first with detection being regarded as impossible. The marginal point Za which has exceeded the threshold value A for the first time is detected and is put as $\alpha$=−Za−Zf+d, where $\alpha$ is the pupil of the observer's eye and assumes the value of the maximum pupil diameter (#108).

Subsequently, j is set to j=Zf−$\alpha$. This limits the range of the photoelectric conversion element because the left-hand marginal point Zb to be found next time is considered to be within a range leftward by at least $\alpha$ from the picture element (position) Zf of the photoelectric element array whose output has been smallest. Here, the differential value Sj is likewise discriminated (#110). This is repeated up to the smallest output picture element Zf (#112−#113). Thereby, a point discriminated as the marginal point nearest to Zf between Zf−$\alpha$ to Zf−1 is detected as the marginal point Zb.

In this manner, the marginal points of the iris and pupil are detected by the use of only the output signal of the photoelectric element array substantially in the vicinity of the pupil.

According to the present embodiment, the design of the invention is made such that detection can be accomplished within a range corresponding to double the maximum pupil diameter. In the present embodiment, the photoelectric element array $Y_{\sigma}$ in which the center of the pupil exists is found with the rotation of the eyeball in the vertical direction (in X—Y plane) being regarded as null, but when there is the rotation of the eyeball in the vertical direction, the calculated position of the photoelectric element array $Y_{\sigma}$ somewhat deviates from the position of the photoelectric element array in which the center of the pupil actually exists, but this poses no problem in practical use.

According to the present invention, as previously described, there can be achieved a visual axis detection apparatus which utilizes the output signal from one of a plurality of photoelectric element arrays constituting light receiving means which satisfies a preset condition, to thereby detect the position information of the reflected image of the iris highly accurately and which is high in detection speed and capable of highly accurate visual axis detection.

Particularly, according to the present invention, when the marginal points of the iris and pupil are to be detected from the reflected image of the iris, the marginal points are detected on the basis of the position information of one of the photoelectric element arrays the output of whose image signal is smallest, thereby improving the reliability of detection and making software for discriminating whether each detected point is the marginal point unnecessary. Also, detection of the iris is made possible simply by processing the image signal of the vicinity of a portion which seems to be the pupil, and this leads to the feature that calculation time is short and it is easy to accomplish visual axis detection on real time.

Also, illuminating means for creating the corneal reflection image and illuminating means for the detection of iris information which illuminates the entire eyeball are provided discretely from each other, and this leads to the feature that the marginal points of the iris and pupil can be accurately detected without being hampered by the corneal reflection image and detection is possible even for the movement of the eyeball in a wide range.

What is claimed is:

1. A visual axis detection apparatus including:

sensor means having a plurality of photoelectric conversion elements for converting reflected light from an eye into electrical signals, wherein at least one of said plurality of photoelectric conversion elements outputs an electrical signal representing a Purkinje image;

first memory means for storing position information of one of said plurality of photoelectric conversion elements which outputs the smallest electrical signal;

second memory means for extracting an electrical signal from the photoelectric conversion element indicative of a particular point of the eye on the basis of the position information and the electrical signals of said plurality of photoelectric conversion elements, and storing position information of the photoelectric conversion element from which the electrical signal was extracted;

third memory means for string position information of the photoelectric conversion element outputting an electrical signal representing a Purkinje image; and signal forming means for forming a signal relating to the visual axis of the eye on the basis of the position information stored in said second memory means and said third memory means.

2. A visual axis detection apparatus according to claim 1, wherein the position information stored in said third memory means corresponds to the position of one of said photoelectric conversion elements which outputs the highest electrical signal.

3. A visual axis detection apparatus according to claim 1, wherein the position information stored in said second memory means corresponds to the position of one of adjacent photoelectric conversion elements wherein the difference between the electrical signals output therefrom is equal to or above a predetermined level.

4. A visual axis detection apparatus according to claim 1, wherein said sensor means comprises a plurality of photoelectric conversion element arrays.

5. A visual axis detection apparatus according to claim 4, wherein said second memory means extracts and stores an electrical signal indicative of a particular point on the basis of the electrical signals of the plurality of photoelectric conversion elements which are in a predetermined range of said photoelectric conversion element arrays based on the position information stored in said first memory means.

6. A visual axis detection apparatus including:

sensor means having a plurality of photoelectric conversion elements for converting reflected light from an eye into electrical signals, wherein at least one of said plurality of photoelectric conversion elements outputs an electrical signal representing a Purkinje image;

first detection means for detecting the position of one of said plurality of photoelectric conversion elements which outputs the smallest electrical signal;

second detection means for detecting the position of the photoelectric conversion element indicative of a particular point of the eye on the basis of the position detected by said first detecting means and the electrical signals of said plurality of photoelectric conversion elements;

third detection means for detecting the position of the photoelectric conversion element which outputs an electrical signal representing a Purkinje image; and forming means for forming information relating to the visual axis of the eye on the basis of the positions of said second and third detection means.

7. A visual axis detection apparatus according to claim 6, wherein the position detected by said third detection means corresponds to the position of a photoelectric conversion element which outputs the highest electrical signal.

* * * * *

UNITED STATES PATENT AND TRADEMARK OFFICE
CERTIFICATE OF CORRECTION

PATENT NO. : 5,280,312
DATED : January 18, 1994
INVENTOR(S) : AKIRA YAMADA, ET AL.

It is certified that error appears in the above-indentified patent and that said Letters Patent is hereby corrected as shown below:

COLUMN 1
    Line 47, "a light beam" should read --light beams--.

COLUMN 2
    Line 11, "into as" should read --as--.
    Line 23, "sand" should read --and--.

COLUMN 3
    Line 4, "visual." should read --visual--.

COLUMN 4
    Line 27, "diodes 5a" should read --diode. 5a--.
    Line 31, "are" should read --is--.

COLUMN 5
    Line 1, "slits" should read --slit--.
    Line 11, "OR" should read --QR--.
    Line 51, "tie," should read --time,--.

UNITED STATES PATENT AND TRADEMARK OFFICE
CERTIFICATE OF CORRECTION

PATENT NO. : 5,280,312
DATED : January 18, 1994
INVENTOR(S) : AKIRA YAMADA, ET AL.

It is certified that error appears in the above-indentified patent and that said Letters Patent is hereby corrected as shown below:

<u>COLUMN 7</u>
Line 56, "eyeball." should read --eyeball--.

<u>COLUMN 10</u>
Line 36, "on" should read --in--.
Line 67, "string" should read "storing--.

Signed and Sealed this

Ninth Day of August, 1994

Attest:

BRUCE LEHMAN

Attesting Officer        Commissioner of Patents and Trademarks